Feb. 4, 1969 E. W. BALL 3,425,086
PAINT ROLLER SPINDLE
Filed Sept. 9, 1966

INVENTOR.
ELDON W. BALL
BY
*Blair, Buckles & Cesari*
ATTORNEYS

INVENTOR.
ELDON W. BALL
BY
*Blair, Buckles & Cesari*
ATTORNEYS

INVENTOR.
ELDON W. BALL
BY
ATTORNEYS

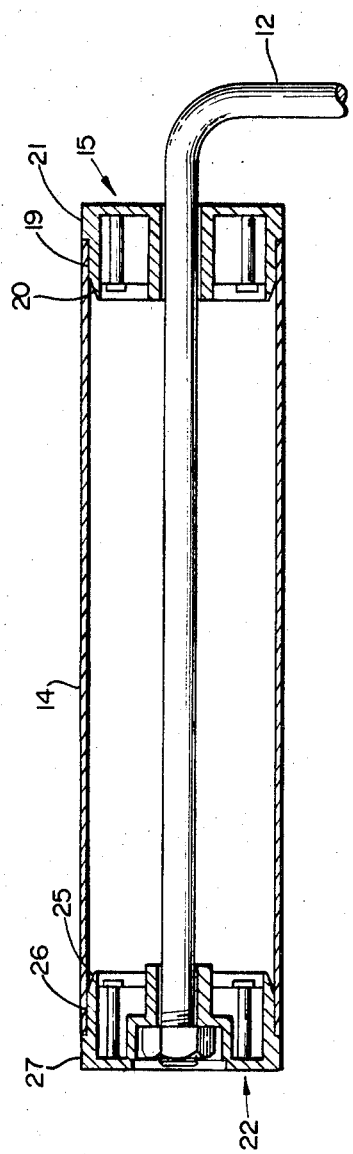

United States Patent Office 3,425,086
Patented Feb. 4, 1969

3,425,086
PAINT ROLLER SPINDLE
Eldon W. Ball, Natick, Mass., assignor to Baltimore
Brushes, Roxbury, Mass.
Filed Sept. 9, 1966, Ser. No. 578,293
U.S. Cl. 15—230.11    9 Claims
Int. Cl. B05c 1/08; B44d 1/00

ABSTRACT OF THE DISCLOSURE

A paint roller spindle is formed of a deformable, tubular material having a continuous periphery and non-circular cross-section. When the spindle is inserted into a sleeve that exerts a radial, compressive force on portions of the spindle, other portions of the spindle bulge radially outward causing the spindle more nearly to assume the cross-sectional configuration of the sleeve.

---

The present invention relates to paint rollers. More specifically it relates to a novel paint roller spindle configuration.

With the advent of water-base paint, more and more painting is being done with rollers rather than with brushes. Since water-base paints are generally more viscous than oil-base paints, a large swath of paint may be applied by roller with less effort than with a brush. Then too, special texturing effects are possible with the use of a roller that cannot be achieved using a brush.

The typical paint roller has a rigid handle made from wood, plastic, or a suitable metal, and a shaft extending generally at a right angle with respect to the handle. The shaft carries a spindle adapted for rotation about the shaft.

In conventional paint rollers the spindle has a circular cross-section and is made to carry a porous sleeve that is tightly fitted to it. The sleeve is in turn saturated with the paint to be applied by the roller.

One disadvantage of this prior art arrangement is that the spindles and sleeves must be manufactured to close tolerances in order that they may be completely interchangeable. Any lack of concentricity between the sleeve and the spindle makes it difficult to insert the spindle into the sleeve. It also becomes especially difficult to remove the sleeve from the spindle once the paint has begun to dry. The close tolerances required between the sleeve and the spindle also make these elements more costly than they might otherwise be.

While efforts have been made obviate the tolerance requirements between the spindle and the sleeve, such solutions have tended to make the roller even more costly. One example of this involves the use of a plurality of springy members on the spindle which are urged out against the sleeve when the sleeve is inserted onto the spindle. While this spindle arrangement may fit well with the sleeve, the production cost is high because of the high degee of manual dexterity required to fit such spindles into their retaining end caps.

It is, therefore, an object of this invention to provide a lower cost paint roller which will obviate the tolerance requirements inherent in having the spindle and the sleeve with the same cross-sectional configuration.

Another object of this invention is to provide a low-cost paint roller which facilitates removal and insertion of the paint applicator sleeve.

Yet, another object of this invention is to provide a paint roller capable of securely retaining a paint applicator sleeve while at the same time making it possible to insert and remove the sleeve with less difficulty.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 12 is a longitudinal section of the paint roller depicted in FIG. 1.

According to my invention, I provide an improvement in the spindle construction of a paint roller by forming the spindle as a tube of non-circular cross-section and making it from a deformable material.

Figure 1:
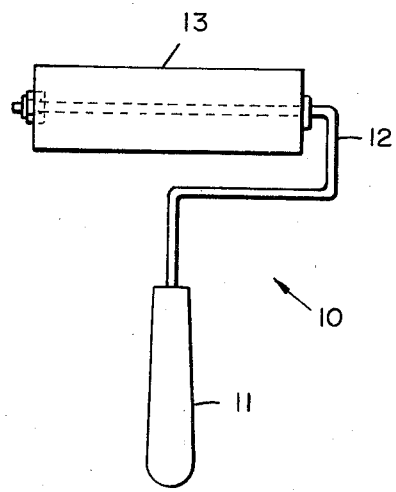
FIGURE 1 is a plan view of a typical paint roller.

Illustrated in FIGURE 1 is a typical paint roller 10. The roller consists principally of a handle portion 11 and a shaft 12 attached to the handle 11 and extending substantially at a right angle thereto. The shaft 12 is adapted to carry a spindle 13. The spindle 13 is made to rotate freely on the shaft 12 and is fitted with a sleeve (not shown) that is saturated with the paint to be applied by the roller 10.

Figure 2:
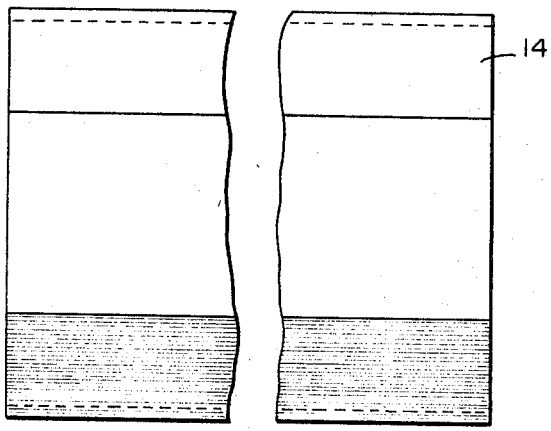
FIGURE 2 is an elevational view, broken, of the preferred spindle embodiment of the present invention.

FIGURE 2 illustrates the preferred embodiment of the spindle 14 of the present invention. The spindle 14 is essentially a hexagonal tube made from a deformable material. The spindle 14 may be fabricated from thin, springy sheet metal or extruded plastic materials. Polyolefins such as polypropylene, are especially well suited for this application because of their relatively low cost and ease of fabrication. They are also corrosion resistant and have an appealing appearance.

Figure 3:
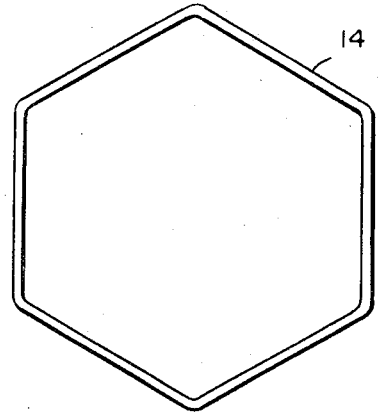
FIGURE 3 is an end elevation of the spindle embodiment of FIGURE 2.

Illustrated in FIGURE 3 is an end view of the spindle 14 illustrating more clearly its hexagonal cross-section. The hexagonal cross-section is believed to be particularly desirable for several reasons. First, it provides six points of contact with the paint applicator sleeve that is fitted thereto. There should be enough points of contact with the sleeve to secure it adequately to the spindle. Too many points of contact, however, give rise to the tolerance problems pointed out above with respect to the prior art. In addition, the hexagonal shape facilitates design of the extrusion die if thermoplastic materials are to be used for the spindle. True hexagons are easily laid out since the radii from the center of the hexagon to its corners form equilateral triangles with its sides. Ellipses and many of the other polygon configurations are more difficult to lay out for the manufacture of extrusion dies.

Figure 5:
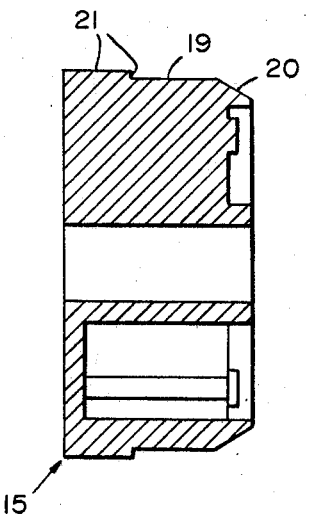
FIGURE 5 is an elevational section taken along the line V—V of the end cap illustrated in FIGURE 4.
Figure 4:
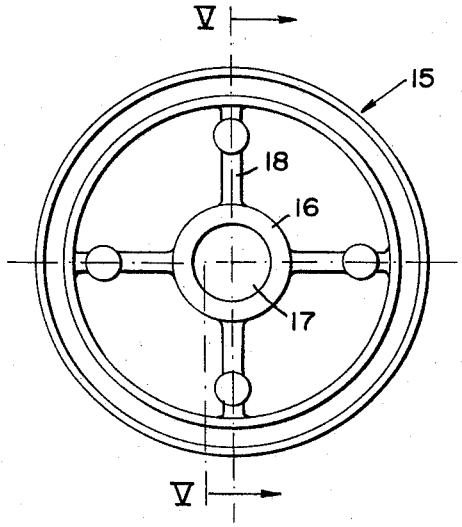
FIGURE 4 is an elevational view of an inner end cap for use with the spindle of FIGURE 2.

Referring now to FIGURES 4 and 5 there is shown an inner end cap 15 suitable for securing the spindle 14 for rotation about the roller shaft. The end cap 15 has a circular periphery. It also has an inner annulus 16 having an aperture 17 adapted to receive the paint roller shaft. Extending from the inner annulus 16 are spokes 18 which support the outer periphery of the cap 15.

The outer periphery of surface of the cap 15 has three principal portions. The center portion 19 is made to bear against the inside of the hexagonal spindle 14. To facilitate insertion of the end cap 15 into the spindle 14 the inner edge 20 of the periphery of end cap 15 is chamfered. So that the end cap 15 cannot be inserted too far into the spindle 14, a shoulder 21 is provided. The shoulder 21 should not be thicker than the wall thickness of the spindle 14. In other words, the diameter of the spindle 15 at the shoulder 21 should not exceed the total outside diameter of the spindle 14 after insertion onto end cap 15.

Figure 7:
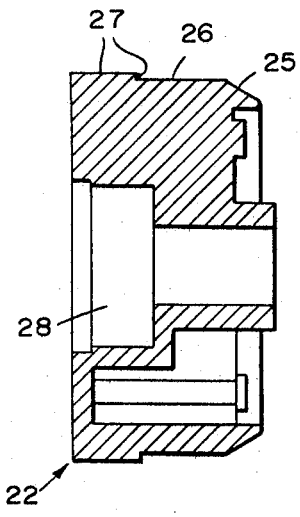
FIGURE 7 is an elevational section taken along the line VII—VII of the end cap illustrated in FIGURE 6.
Figure 6:
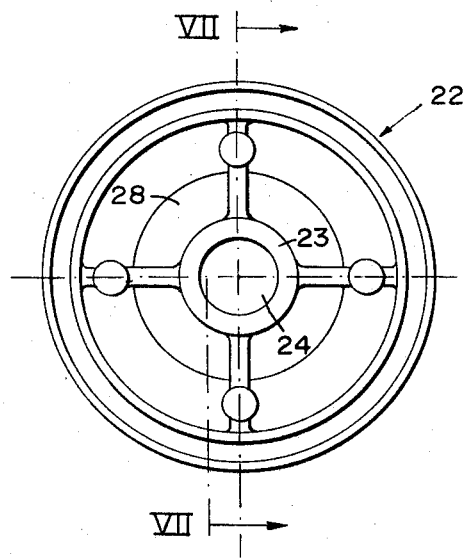
FIGURE 6 is an elevational view of an outer end cap used with the spindle illustrated in FIGURE 2.

FIGURES 6 and 7 show the outer end cap 22 which is similar in construction to the inner end cap 15. The end cap 22 has a circular periphery. It has a central annulus 23 having an aperture therein 24 for receiving the shaft of the paint roller.

The outer pheriphery of end cap 22 has a chamfered edge 25 which facilitates its insertion into the spindle 14. As it does with end cap 15, the spindle 14 fits around the surface 26 of the cap and is forced up to the shoulder 27.

The principal distinction between the outer end cap 22 and the inner end cap 15 is the fact that end cap 22 is provided with a recession 28. The purpose of recession 28 is to provide room for a nut or other fastening means (not shown) to secure the spindle 14 and caps 15 and 22 to the paint roller shaft. The recession 28 also enables the nut or fastening means to be mounted flush with the surface of end cap 22. The fit between the sleeve 14 and end caps 15 and 22 is sufficiently tight to seal the interior of the spindle 14 from paint seepage and to make the use of adhesives unnecessary. Loosening of the end caps 15 and 22 does not occur because retaining means on the shaft continuously urge the end caps 15 and 22 into the spindle 14.

Figure 10:
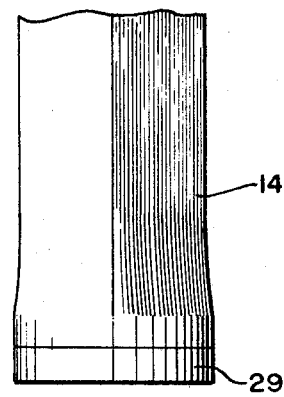
FIGURE 10 is an elevational view of a portion of the spindle embodiment of FIGURE 8 taken along the line X—X.
Figure 9:
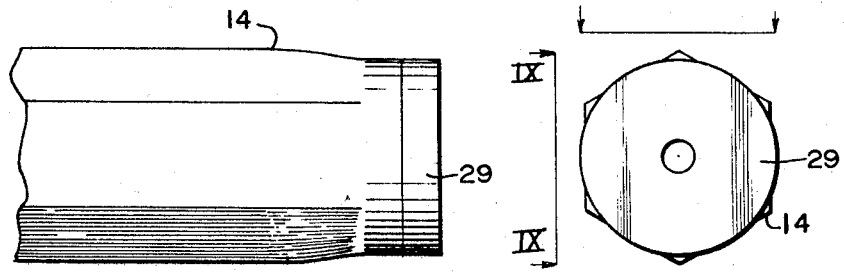
FIGURE 9 is an elevational view of a portion of the spindle embodiment of FIGURE 8 taken along the line IX—IX.
Figure 8:
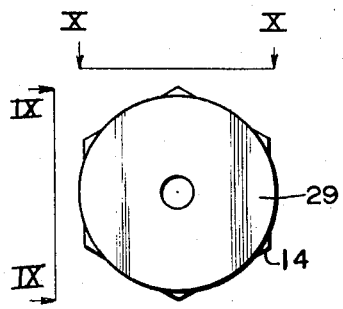
FIGURE 8 is an end view of the preferred spindle embodiment of the present invention with an end cap inserted herein.

The effect of inserting round end caps into the hexagonal spindle 14 may be discerned more clearly by reference to FIGURES 8, 9 and 10. Here an end cap 29, with structural details omitted, is shown inserted in the spindle 14. The ends of the spindle 14 are deformed to a circular shape but not stretched. The perimeter of the spindle 14 remains the same. The spindle 14 and end cap 29 are designed to make this circular section slightly smaller than the minimum inside diameter of the paint applicator sleeve to be used on the spindle 14. The effect of this is to bow out the sides of the hexagon and to reduce the distance between the diametrically opposite corners.

The details of the assembled paint roller spindle are shown in FIG. 12.

Figure 11:
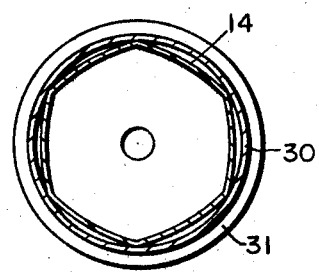
FIGURE 11 is an end view, in section, of the preferred spindle embodiment of the present invention with a paint applicator sleeve thereon.

FIGURE 11 illustrates the spindle 14 with a paint applicator sleeve 30, having an aborbent nap 31, inserted thereon. The main body of the spindle 14 retains its hexagonal shape but is deformed, upon installation of the sleeve 30, in varying amounts depending upon the actual inside diameter of the sleeve 30. The inside diameter of the sleeve 20 can vary from slightly less than the "overpoints," or corner to diagonally opposite corner, dimension of the hexagon to slightly more than the outside diameter of the end caps. This hexagonal configuration permits a large tolerance range on the inside diameter of the sleeve.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a paint roller having a handle, a shaft extending from said handle and a spindle adapted to rotate about said shaft, the improvement comprising: a thin-walled tubular spindle of polygonal cross-section made from a deformable resilient material having a continuous periphery throughout its length so that longitudinally extending edges of the spindle periphery are radially farthest from the central axis of said spindle; said edges being readily compressed to conform their radii to the inner radius of a paint applying sleeve of circular cross-section, said edges being urged outwardly toward said sleeve because of the corresponding deformation of remaining portions of said spindle when said edges are compressed, thereby to provide a firmer grip of said sleeve on said spindle.

2. The paint roller spindle of claim 1 wherein said spindle is of a hexagonal cross-section.

3. The paint roller spindle of claim 2 wherein said spindle is made of a thermoplastic.

4. The paint roller spindle of claim 2 wherein said spindle is made of a polyolefin.

5. The paint roller spindle of claim 2 wherein said spindle is made of polypropylene.

6. The paint roller spindle of claim 2 wherein said spindle is made of sheet metal.

7. A paint roller comprising:
(a) a handle;
(b) a shaft extending from said handle; and
(c) a deformable, resilient, tubular spindle having a continuous periphery of polygonal cross-section and a pair of substantially circular end caps which exert a radial force on the ends of said spindle and cause said spindle ends to assume a substantially circular cross-section,
(d) said end caps having apertures therein adapted to receive said shaft and enable rotation of said spindle about said shaft.

8. A paint roller assembly comprising:
(a) a handle,
(b) a shaft extending from said handle,
(c) a tubular spindle arranged for rotation about said shaft,
(d) a paint applicator sleeve of circular cross-section disposed around said spindle,
(e) said spindle having a continuous polygonal cross-section, the vertices of the polygon being longitudinally extending edges of said spindle, said edges extending farther in the radial direction than the faces between said edges, the normal radius of said edges being greater than the internal radius of said sleeve, said edges being readily compressed to decrease their radius in order to fit said sleeve over said spindle, said faces being elastically deformed upon compression of said edges to provide a restoring force urging said edges against the interior surface of said sleeve and thereby secure said sleeve on said spindle for rotation therewith, said spindle further including end caps having apertures therein receiving said shaft for rotation of said spindle, said end caps being substantially circular and exerting a radial force on the ends of said spindle to cause said spindle ends to assume a substantially circular cross-section.

9. The assembly defined in claim 8 in which said spindle has a normally hexagonal cross-section.

(References on following page)

References Cited

UNITED STATES PATENTS

| | | | |
|---|---|---|---|
| 1,198,102 | 9/1916 | Briscoe | 242—55.2 |
| 1,534,559 | 4/1925 | Yant | 29—110.5 |
| 2,181,207 | 11/1939 | Sanford | 242—55.2 |
| 2,571,321 | 10/1951 | Wettley | 242—55.2 |
| 2,815,563 | 12/1957 | Weber | 29—116 |
| 2,889,696 | 6/1959 | Lynch | 29—116 |
| 3,228,087 | 1/1966 | Stoddart et al. | 15—230.11 |

FOREIGN PATENTS

| | | |
|---|---|---|
| 355,568 | 8/1931 | Great Britain. |
| 190,087 | 6/1937 | Switzerland. |

DANIEL BLUM, *Primary Examiner.*

U.S. Cl. X.R.

29—110.5, 116